United States Patent
Pohl et al.

(10) Patent No.: US 10,344,168 B2
(45) Date of Patent: Jul. 9, 2019

(54) PROCESS FOR IMPROVING THE PARTICLE SIZE DISTRIBUTION OF A CALCIUM CARBONATE-CONTAINING MATERIAL

(71) Applicant: Omya International AG, Oftringen (CH)

(72) Inventors: Michael Pohl, Villach (AT); Christian Rainer, Villach (AT)

(73) Assignee: Omya International AG, Oftringen (CH)

( * ) Notice: Subject to any disclaimer, the term of this patent is extended or adjusted under 35 U.S.C. 154(b) by 109 days.

(21) Appl. No.: 15/030,422

(22) PCT Filed: Oct. 30, 2014

(86) PCT No.: PCT/EP2014/073356
§ 371 (c)(1),
(2) Date: Apr. 19, 2016

(87) PCT Pub. No.: WO2015/067522
PCT Pub. Date: May 14, 2015

(65) Prior Publication Data
US 2016/0264785 A1    Sep. 15, 2016

Related U.S. Application Data

(60) Provisional application No. 61/904,541, filed on Nov. 15, 2013.

(30) Foreign Application Priority Data

Nov. 8, 2013    (EP) .................................... 13192156

(51) Int. Cl.
C08K 3/26    (2006.01)
C09C 1/02    (2006.01)
C01F 11/18   (2006.01)
C04B 14/28   (2006.01)

(52) U.S. Cl.
CPC ............ C09C 1/021 (2013.01); C01F 11/185 (2013.01); C04B 14/28 (2013.01); C08K 3/26 (2013.01); *C01P 2004/51* (2013.01); *C01P 2004/52* (2013.01); *C01P 2004/54* (2013.01); *C01P 2004/61* (2013.01); *C01P 2006/12* (2013.01); *C08K 2003/265* (2013.01)

(58) Field of Classification Search
CPC . C09C 1/00; C09C 1/021; C01F 11/00; C01F 11/185; C04B 14/00; C04B 14/28; C08K 3/26; C08K 2003/265; C01P 2004/51; C01P 2004/52; C01P 2006/12
See application file for complete search history.

(56) References Cited

U.S. PATENT DOCUMENTS

| | | | |
|---|---|---|---|
| 5,269,818 A | 12/1993 | Kunesh et al. | |
| 5,384,013 A * | 1/1995 | Husband | D21H 19/56 106/436 |
| 2002/0155055 A1 | 10/2002 | Denholm et al. | |
| 2009/0044725 A1 | 2/2009 | Rainer et al. | |
| 2010/0219269 A1 | 9/2010 | Husband et al. | |

FOREIGN PATENT DOCUMENTS

| | | |
|---|---|---|
| CN | 1161996 A | 10/1997 |
| EP | 1764346 A1 | 3/2007 |
| EP | 2644568 A1 | 10/2013 |
| JP | H11349846 A | 12/1999 |
| WO | 03000592 A1 | 1/2003 |
| WO | 2007031868 A1 | 3/2007 |

OTHER PUBLICATIONS

International Search Report dated Jan. 9, 2015 for PCT Application No. PCT/EP2014/073356.
Written Opinion of International Searching Authority dated Jan. 9, 2015 for PCT Application No. PCT/EP2014/073356.
Office action dated Aug. 9, 2016 for Australian Application No. 2014345744.
Office action dated Mar. 13, 2017 for Canadian Application No. 2,927,899.
Office action dated Oct. 28, 2016 for Chinese Application No. 201480061013.8.
Office action dated Aug. 3, 2017 for Colombian Application No. 16118417.
European Search Report dated Mar. 21, 2014 for European Application No. 13192156.1.
Office action dated May 1, 2018 for The Cooperation Council for the Arab States of the Gulf Application No. GC 2014-28274.
Office action dated Jul. 4, 2017 for Japanese Application No. 2016-528067.
Office action dated Feb. 24, 2018 for Korean Application No. 10-2016-7014778.
Office action dated Mar. 1, 2018 for Russian Application No. 2016122465.
Decision to Grant dated Mar. 23, 2018 for Russian Application No. 2016122465.
Office action dated Sep. 7, 2015 for Taiwanese Application No. 103137784.

* cited by examiner

*Primary Examiner* — Pegah Parvini
(74) *Attorney, Agent, or Firm* — Amster, Rothstein & Ebenstein LLP

(57) ABSTRACT

The present invention relates to a process for the preparation of an aqueous suspension comprising at least one calcium carbonate-containing material. The invention further relates to calcium carbonate-containing material having a ratio of particles having an average particle size $d_{80}$ value to particles having an average particle size $d_{20}$ value $[d_{80}/d_{20}]$ of ≤2.50 and the use of the calcium carbonate-containing material in paper and board applications, in cosmetics, in caulks and sealants, in paints and coatings, or in plastics applications.

30 Claims, 2 Drawing Sheets

PROCESS FOR IMPROVING THE PARTICLE SIZE DISTRIBUTION OF A CALCIUM CARBONATE-CONTAINING MATERIAL

CROSS-REFERENCE TO RELATED APPLICATIONS

This is a U.S. national phase of PCT Application No. PCT/EP2014/073356, filed Oct. 30, 2014, which claims priority to European Application No. 13192156.1, filed Nov. 8, 2013 and U.S. Provisional Application No. 61/904,541 filed Nov. 15, 2013.

The present invention relates to a process for the preparation of an aqueous suspension comprising at least one calcium carbonate-containing material. The invention further relates to calcium carbonate-containing material having a ratio of particles having an average particle size $d_{80}$ value to particles having an average particle size $d_{20}$ value $[d_{80}/d_{20}]$ of ≤2.50 and the use of the calcium carbonate-containing material in paper and board applications, in adhesives, in cosmetics, in caulks and sealants, in paints and coatings, in underbody coatings, for fibre applications, for the replacement of precipitated calcium carbonate or in plastics applications.

Calcium carbonate is used extensively in the paper industry as a filler component in paper. It is a low cost, high brightness filler used to increase sheet brightness and opacity. Its use has increased dramatically in the last decades due to the conversion from acid to alkaline papermaking at paper mills. Calcium carbonate is known to exist as natural occurring minerals as well as synthetically produced products. Both natural and synthetic calcium carbonates are used in the paper industry. Besides its use in the paper industry, calcium carbonates are also used for various other purposes, e.g. as filler or pigment in the paint industries, and as functional filler for the manufacture of plastic materials, plastisols, sealing compounds, printing inks, rubber, toothpaste, cosmetics, agricultural applications etc.

Natural calcium carbonate is typically ground to a small particle size prior to its use in paper or other applications.

However, for many applications it is desired to provide a calcium carbonate having a low BET specific surface area and narrow particle size distribution at low content of fines as such characteristics typically impart positive optical properties such as opacity and brightness and light scattering properties to a paper product comprising such calcium carbonate. Furthermore, a narrow particle size distribution at low BET specific surface area is advantageous for hydrophobized calcium carbonate products typically used for plastic applications as the amount of, for example, stearic acid, which may be used as hydrophobizing agent for preparing such hydrophobized products, can be reduced. In addition thereto, said narrow particle size distribution at low BET specific surface area has also positive effects on calcium carbonate slurries as the amount of dispersants often used for dispersing calcium carbonate in the slurry can be reduced.

In this regard, methods for decreasing the BET specific surface area and narrowing the particle size distribution are well known in the art. For example, U.S. Pat. No. 5,269,818 A refers to a heat-aging process which is adapted to produce large amounts of heat-aged calcium carbonate suspension. The process comprises the steps of initiating heat-aging of the calcium carbonate having a specific surface area greater than about 15 m²/g by heating it to an aging temperature of from about 40° C. to about 100° C.; adjusting the pH of the calcium carbonate at the aging temperature to about 6.5, such as by addition of carbon dioxide; adding an alkali metal hydroxide to the calcium carbonate at the aging temperature to raise the pH to from about 9.5 to about 12.0; maintaining the calcium carbonate at the aging temperature for a sufficient time to cause the morphology of the calcium carbonate to rearrange to the final form; and terminating heat-aging to fix the morphology of the calcium carbonate in the final form. US 2002/0155055 A1 relates to ground calcium carbonate compositions having narrow particle size distributions and a method for producing the compositions. The method involves forming a substantially dispersant-free calcium carbonate suspension, wet-grinding the suspension, and aging the suspension. Aging takes place at temperatures below 40° C.

However, these methods have the drawback that such aging processes are typically time-consuming. For example, it is described in U.S. Pat. No. 5,269,818 A that where the calcium carbonate starting material has an initial average particle size of from about 0.01 to about 0.5 microns and has a high purity, the aging time is as short as about 60 minutes, while for a calcium carbonate starting material having a larger initial agglomerated particle size of from about 0.5 to about 2 microns, and/or containing impurities of up to about 5 weight percent, the heat-aging time can be as long as 24 hours. Similar to that US 2002/0155055 A1 describes that aging will last about 24 hours.

Thus, there is still a need in the art for providing alternative processes for preparing a calcium carbonate-containing material having a narrow particle size distribution and low BET specific surface area, wherein such process should be simple and inexpensive, while avoiding the use of time-consuming ageing steps after grinding.

Accordingly, it is an objective of the present invention to provide an alternative process for preparing a calcium carbonate-containing material having an improved or optimized narrow particle size distribution at a low amount of fines. Another objective of the present invention may be seen in the provision of a process for preparing a calcium carbonate-containing material having reduced or optimized values for the BET specific surface area. A further objective of the present invention may be seen in the provision of a process for preparing a calcium carbonate-containing material having improved or optimized optical properties such as opacity and brightness and light scattering properties. Another objective of the present invention may be seen in the provision of a process for preparing a calcium carbonate-containing material being available as partially dewatered or essentially completely dried calcium carbonate-containing material. Even a further objective of the present invention may be seen in the provision of a process for preparing wet-ground calcium carbonate which can be carried out in a simple and inexpensive way. A still further objective of the present invention may be seen in the provision of a process for preparing a calcium carbonate-containing material, in which the use of time-consuming ageing steps after grinding can be avoided. Further objects can be gathered from the following description of the invention.

In order to fulfil the foregoing need(s) a process according to the subject-matter as defined herein in claim 1 is provided.

Figure 1:
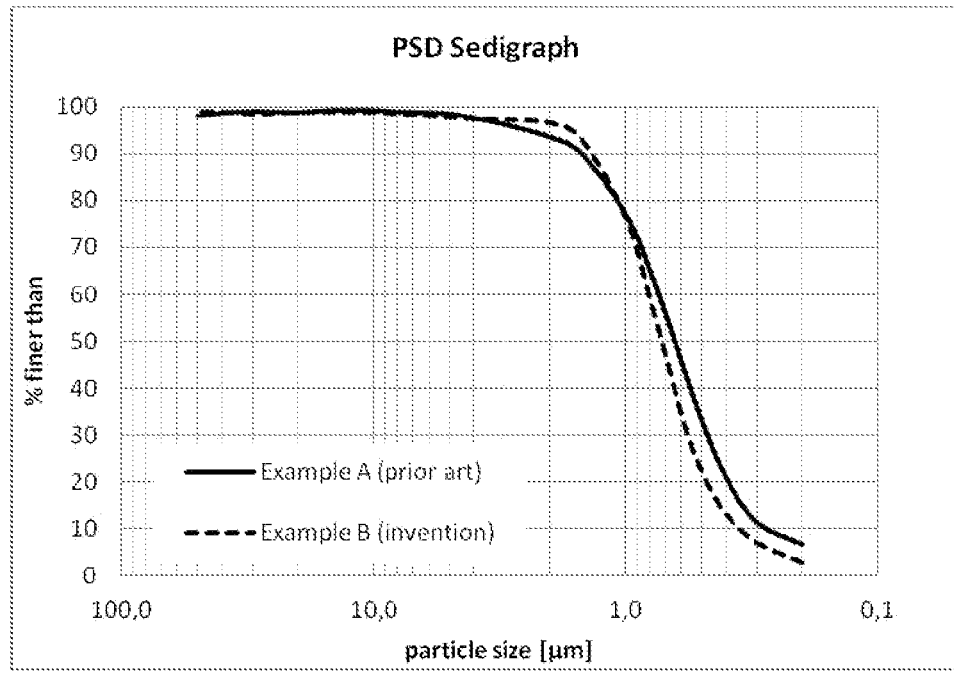
FIG. 1: Comparison of Example A and Example B particle size distribution of a calcium carbonate by PSD sedigraph.

Advantageous embodiments of the inventive process are defined in the corresponding sub-claims and the specification.

According to one aspect of the present invention a process for the preparation of an aqueous suspension comprising at least one calcium carbonate-containing material, the process comprising:

a) providing a substantially dispersant-free aqueous suspension of at least one calcium carbonate-containing material,
b) pre-heating the suspension of step a) to a temperature of from 40 to 95° C. at ambient pressure,
c) contacting the aqueous suspension of step a) before and/or during and/or after pre-heating step b) and/or before and/or during and/or after wet-grinding step d) with at least one base for obtaining an aqueous suspension having a pH measured at 25° C. of ≥9.0, and
d) wet-grinding the pre-heated suspension of step b) or of step c) in at least one grinding step for obtaining an aqueous suspension of at least one calcium carbonate-containing material having a ratio of particles having an average particle size $d_{80}$ value to particles having an average particle size $d_{20}$ value $[d_{80}/d_{20}]$ of ≤2.50.

The inventors surprisingly found out that the foregoing process allows for the efficient and controlled production of a calcium carbonate-containing material having an improved or optimized narrow particle size distribution at a low amount of fines, as well as improved or optimized BET specific surface area. According to the process of the present invention a calcium carbonate-containing material having improved or optimized optical properties and light scattering properties can be prepared directly in a simple and inexpensive way and without the use of time-consuming ageing steps after grinding. More precisely, the inventors found out that the particle size distribution as well as the BET specific surface area of a calcium carbonate-containing material being obtained by said process can be improved or optimized by specifically grinding a pre-heated suspension of a calcium carbonate-containing material featuring a pH of ≥9.0.

It should be understood that for the purposes of the present invention, the following terms have the following meanings:

A "suspension" or "slurry" in the meaning of the present invention comprises insoluble solids and water and optionally further additives and usually contains large amounts of solids and, thus, is more viscous and generally of higher density than the liquid from which it is formed.

The term "calcium carbonate-containing material" in the meaning of the present invention refers to a material that comprises at least 40.0 wt.-% calcium carbonate, based on the total dry weight of the calcium carbonate-containing material. Preferably, the calcium carbonate-containing material comprises at least 60.0 wt.-%, preferably at least 80.0 wt.-%, more preferably at least 85.0 wt.-%, even more preferably at least 90.0 wt.-% and most preferably at least 95.0 wt.-%, such as at least 98.0 wt.-%, of calcium carbonate, based on the total dry weight of the calcium carbonate-containing material.

As used herein and as generally defined in the art, the "$d_{80}$" value and "$d_{20}$" value is determined based on measurements made by using a Sedigraph™ III Plus of Micromeritics Instrument Corporation (operating instrument software version 1.04) and is defined as the size at which 80% and 20%, respectively, of the particle mass is accounted for by particles having a diameter equal to the specified value. The method and the instrument are known to the skilled person and are commonly used to determine grain size of fillers and pigments.

The term "base" in the meaning of the present invention refers to a base in accordance with the Brønsted-Lowry concept.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms such as "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to another aspect of the present invention, a calcium carbonate-containing material is provided, wherein said calcium carbonate-containing material has a ratio of particles having an average particle size $d_{80}$ value to particles having an average particle size $d_{20}$ value $[d_{80}/d_{20}]$ of ≤2.50, wherein the calcium carbonate-containing material has been obtained by the process described herein. It is preferred that the calcium carbonate-containing material has a) a ratio of particles having an average particle size $d_{90}$ value to particles having an average particle size $d_{10}$ value $[d_{90}/d_{10}]$ of ≤4.50, and/or b) a BET specific surface are of ≤15.0 m²/g, preferably in the range from 1.0 to 15.0 m²/g, more preferably from 2.0 to 14.0 m²/g, and most preferably from 3.0 to 13.0 m²/g, and/or c) a lower ratio of particles having an average particle size $d_{80}$ value to particles having an average particle size $d_{20}$ value $[d_{80}/d_{20}]$ than a calcium carbonate-containing material that is obtained by wet-grinding the same suspension of step a) to similar particle size but without pre-heating step b) and contacting step c). According to another aspect, the present invention refers to the use of the calcium carbonate-containing material in paper and board applications, in adhesives, in cosmetics, in caulks and sealants, in paints and coatings, in underbody coatings, for fibre applications, for the replacement of precipitated calcium carbonate or in plastics applications.

According to one embodiment of the inventive process, the at least one calcium carbonate-containing material provided in the aqueous suspension of step a) is dolomite and/or a natural ground calcium carbonate (NGCC), such as one or more of marble, limestone and/or chalk.

According to another embodiment of the inventive process, the aqueous suspension provided in step a) has solids content of from 5.0 wt.-% to 60.0 wt.-%, preferably from 10.0 wt.-% to 55.0 wt.-% and most preferably from 15.0 wt.-% to 50.0 wt.-%, based on the total weight of the aqueous suspension.

According to yet another embodiment of the inventive process, the aqueous suspension of step a) is adjusted in pre-heating step b) to a temperature of from 50 to 95° C., preferably from 60 to 90° C., such as about 70° C., at ambient pressure.

According to one embodiment of the present invention, contacting step c) is carried out a) before and/or during pre-heating step b), preferably during pre-heating step b), and/or b) such that the obtained aqueous suspension has a pH measured at 25° C. of from 10.0 to 13.0 and preferably from 11.0 to 12.5.

According to another embodiment of the present invention, the at least one base in step c) is a) added in an amount of ≥0.05 wt.-%, preferably of ≥0.1 wt.-%, more preferably of ≥0.2 wt.-% and most preferably of from 0.2 to 1.0 wt.-%, based on the total dry weight of the calcium carbonate-containing material, and/or b) at least one alkali metal hydroxide selected from the group comprising lithium hydroxide, sodium hydroxide, potassium hydroxide and mixtures thereof and/or at least one earth alkali metal hydroxide selected from the group comprising magnesium hydroxide, calcium hydroxide and mixtures thereof.

According to one embodiment of the present invention, wet-grinding step d) is carried out at a starting temperature of from 40 to 95° C., preferably from 60 to 80° C., more preferably from 65 to 75° C., such as about 70° C.

According to another embodiment of the present invention, the process further comprises step e) of storing the aqueous suspension obtained in wet-grinding step d) at a temperature of from 70 to 140° C., preferably from 75 to 140° C. and most preferably from 80 to 95° C., and/or for a period of time of ≤5 hours, preferably ≤2 hours, more preferably ≤60 minutes, most preferably ≤45 minutes, such as from 5 minutes to 2 hours. It is preferred that the aqueous suspension stored in step e) has solids content of from 5.0 wt.-% to 60.0 wt.-%, preferably from 10.0 wt.-% to 55.0 wt.-%, more preferably from 15.0 wt.-% to 50.0 wt.-% and most preferably from 20.0 wt.-% to 50.0 wt.-% based on the total weight of the aqueous suspension.

According to yet another embodiment of the present invention, the process further comprises step f) of drying or dewatering the aqueous suspension obtained in step d) or optional step e) to remove at least a portion of water to obtain a partially dewatered calcium carbonate-containing material or to obtain an essentially completely dried calcium carbonate-containing material. It is preferred that a) the partially dewatered calcium carbonate-containing material is treated after dewatering step f) with at least one dispersing agent and rediluted to obtain an aqueous suspension comprising a dispersed calcium carbonate-containing material, and/or b) the partially dewatered calcium carbonate-containing material and/or the essentially completely dried calcium carbonate-containing material is treated before or after dewatering or drying step f) with at least one saturated aliphatic linear or branched carboxylic acid to obtain a hydrophobized calcium carbonate-containing material.

The term "essentially completely dried" is understood to refer to a calcium carbonate-containing material having total surface moisture content of less than 3.0 wt.-%, preferably less than 2.0 wt.-%, more preferably less than 1.5 wt.-% and most preferably of less than 1.0 wt.-%, based on the total weight of the calcium carbonate-containing material.

According to one embodiment of the present invention, the at least one calcium carbonate-containing material obtained in step d) and optional step e) and/or step f) has a) a ratio of particles having an average particle size $d_{90}$ value to particles having an average particle size $d_{10}$ value [$d_{90}/d_{10}$] of ≤4.50, and/or b) a BET specific surface area of ≤15.0 $m^2/g$, preferably in the range from 1.0 to 15.0 $m^2/g$, more preferably from 2.0 to 14.0 $m^2/g$, and most preferably from 3.0 to 13.0 $m^2/g$, and/or c) a lower ratio of particles having an average particle size $d_{80}$ value to particles having an average particle size $d_{20}$ value [$d_{80}/d_{20}$] than a calcium carbonate-containing material that is obtained by wet-grinding the same suspension of step a) to similar particle size but without pre-heating step b) and contacting step c).

As set out above, the inventive process for the preparation of an aqueous suspension comprising at least one calcium carbonate-containing material, wherein the at least one calcium carbonate-containing material has improved or optimized particle size distribution as well as improved or optimized BET specific surface area, comprises the steps a), b), c) and d). In the following, it is referred to further details of the present invention and especially the foregoing steps of the inventive process for the preparation of an aqueous suspension comprising at least one calcium carbonate-containing material. Those skilled in the art will understand that many embodiments described herein can be combined or applied together.

Characterization of Step a): Provision of at Least One Calcium Carbonate-Containing Material According to step a) of the process of the present invention, a substantially dispersant-free aqueous suspension of at least one calcium carbonate-containing material is provided.

The term "at least one" calcium carbonate-containing material in the meaning of the present invention means that the calcium carbonate-containing material comprises, preferably consists of, one or more kinds of calcium carbonate-containing materials.

In one embodiment of the present invention, the at least one calcium carbonate-containing material comprises, preferably consists of, one kind of calcium carbonate-containing material. Alternatively, the at least one calcium carbonate-containing material comprises, preferably consists of, two or more kinds of calcium carbonate-containing materials. For example, the at least one calcium carbonate-containing material comprises, preferably consists of, two or three kinds of calcium carbonate-containing materials.

Preferably, the at least one calcium carbonate-containing material is one kind of a calcium carbonate-containing material.

It is appreciated that the at least one calcium carbonate-containing material provided in step a) of the instant process can be any calcium carbonate-containing material that is suitable for the envisaged purpose, i.e. use in paper and board applications, in cosmetics, in caulks and sealants in paints and coatings, or in plastics applications.

The at least one calcium carbonate-containing material according to the present invention is preferably a material that comprises at least 40.0 wt.-%, more preferably at least 60.0 wt.-%, even more preferably at least 80.0 wt.-%, and most preferably at least 90.0 wt.-%, such as at least 95.0 wt.-% or 98.0 wt.-%, of calcium carbonate, based on the total dry weight of the at least one calcium carbonate-containing material.

The at least one calcium carbonate-containing material is preferably dolomite and/or ground (or natural) calcium carbonate (NGCC). For example, the at least one calcium carbonate-containing material is preferably dolomite or ground (or natural) calcium carbonate (NGCC). In one embodiment of the present invention, the at least one calcium carbonate-containing material is ground (or natural) calcium carbonate (NGCC).

NGCC is understood to be a naturally occurring form of calcium carbonate, mined from sedimentary rocks such as limestone or chalk, or from metamorphic marble rocks and processed through a treatment such as grinding, screening and/or fractionizing in wet and/or dry form, for example by a cyclone or classifier.

In one embodiment of the present invention, the at least one calcium carbonate-containing material is a NGCC, such as one or more of marble, limestone and/or chalk. Preferably, the at least one calcium carbonate-containing material is marble or limestone. More preferably, the at least one calcium carbonate-containing material is marble.

The at least one calcium carbonate-containing material is preferably in the form of a particulate material, and may have a particle size distribution as conventionally employed for the material(s) involved in the type of product to be used. In general, it is preferred that the at least one calcium carbonate-containing material has a weight median particle size diameter $d_{80}$ in the range from 0.5 µm to 15.0 µm. For example, the at least one calcium carbonate-containing material has a weight median particle size diameter $d_{80}$ in the range from 0.5 µm to 12.0 µm, more preferably from 1.0 µm to 10.0 µm and most preferably from 1.5 µm to 5.0 µm.

As used herein and as generally defined in the art, the "$d_{80}$" value is determined based on measurements made by using a Sedigraph™ III Plus of Micromeritics Instrument Corporation (operating instrument software version 1.04) and is defined as the size at which 50% (the median point) of the particle mass is accounted for by particles having a diameter equal to the specified value. The method and the instrument are known to the skilled person and are commonly used to determine grain size of fillers and pigments.

Additionally or alternatively, the at least one calcium carbonate-containing material has a $d_{95}$ value of ≤100.0 µm. For example, the at least one calcium carbonate-containing material has a $d_{95}$ value of from 100.0 to 2.0 µm, preferably from 75.0 to 5.0 µm and most preferably from 50.0 to 10.0 µm.

In one embodiment of the present invention, the at least one calcium carbonate-containing material is a dry ground material, a material being wet ground and dried or a mixture of the foregoing materials.

In one embodiment of the present invention, the at least one calcium carbonate-containing material is a material being wet ground and optionally dried and rediluted with water in order to form an aqueous suspension comprising the wet-ground calcium carbonate-containing material. Alternatively, the at least one calcium carbonate-containing material is a material being dry ground and rediluted with water in order to form an aqueous suspension comprising the dry ground calcium carbonate-containing material. Wet-grinding and dry-grinding of the at least one calcium carbonate-containing material can be carried out by any conventional grinding means known to the skilled person. For example, the wet-grinding of the at least one calcium carbonate-containing material can be carried out in a vertical agitated bead mill. Furthermore, the drying can be carried out by any conventional drying or heating means known to the skilled person.

It is appreciated that the at least one calcium carbonate-containing material is provided in form of an aqueous suspension. For example, the aqueous suspension comprises, preferably consists of, the at least one calcium carbonate-containing material and water. Alternatively, the aqueous suspension comprises, preferably consists of, the at least one calcium carbonate-containing material, water and an organic solvent. If the aqueous suspension comprises an organic solvent, the aqueous suspension comprises the organic solvent in an amount of from 1.0 to 20.0 wt.-% preferably from 1.0 to 15.0 wt.-% and most preferably from 1.0 to 10.0 wt.-%, based on the total weight of the aqueous suspension.

In one embodiment of the present invention, the aqueous suspension has solids content, i.e. the at least one calcium carbonate-containing material, of from 5.0 wt.-% to 60.0 wt.-%, preferably from 10.0 wt.-% to 55.0 wt.-% and most preferably from 15.0 wt.-% to 50.0 wt.-%, based on the total weight of the aqueous suspension.

The water to be used in the aqueous suspension may be any water available such as process water, such as process water coming from water treatment systems and/or tap water and/or deionised water. Preferably, the water used for preparing the aqueous suspension of step a) is process water.

It is one requirement of the present invention that the aqueous suspension is substantially free of dispersants.

The term "substantially" dispersant-free refers to systems in which the amount of a dispersant, such as sodium polyacrylate and/or sodium hydrogen phosphate, is too low to hinder the preparation of the inventive at least one calcium carbonate-containing material. Preferably, the aqueous suspension provided in step a) comprises dispersants in an amount of <0.05 wt.-%, more preferably <0.02 wt.-% and most preferably <0.01 wt.-%, based on the total dry weight of the at least one calcium carbonate-containing material. In one embodiment of the present invention, the aqueous suspension of step a) is free of dispersants, i.e. the aqueous suspension comprises no dispersants.

It is appreciated that such dispersants interfere with the present process such that a calcium carbonate-containing material in the meaning of the present invention, i.e. a calcium carbonate-containing material having a ratio of particles having an average particle size $d_{80}$ value to particles having an average particle size $d_{20}$ value $[d_{80}/d_{20}]$ of ≤2.50, is not obtained.

Accordingly, it is preferred that no dispersant is added before and/or during process step a) and/or step b) and/or step c) and/or step d). More preferably, no dispersant is added before and during process step a) and step b) and step c) and step d).

Characterization of Step b): Pre-Heating the Aqueous Suspension

According to step b) of the process of the present invention, the suspension of step a) is pre-heated to a temperature of from 40 to 95° C. at ambient pressure.

In one embodiment of the present invention, the aqueous suspension is adjusted to a temperature of from 50 to 95° C., preferably from 60 to 90° C., such as about 70° C. at ambient pressure.

The pre-heating in the instant process can be carried out by any conventional heating means know to the skilled person.

The temperature in the aqueous suspension varies due to variation in water temperature or quality of water and, thus, the temperature of the aqueous suspension may be adjusted frequently. Preferably, the temperature is controlled continuously. Alternatively, the temperature is controlled repeatedly.

Pre-heating of the aqueous suspension of step a) can be carried out by any conventional heating means known to the skilled person. For example, the pre-heating of the aqueous suspension of step a) can be carried out by using a heat exchanging device.

Characterization of Step c): Contacting the Aqueous Suspension with at Least One Base According to step c) of the process of the present invention, the aqueous suspension of step a) is contacted before and/or during and/or after pre-heating step b) and/or before and/or during and/or after wet-grinding step d) with at least one base for obtaining an aqueous suspension having a pH measured at 25° C. of ≥9.0.

The term "at least one" base in the meaning of the present invention means that the base comprises, preferably consists of, one or more kinds of bases.

In one embodiment of the present invention, the at least one base comprises, preferably consists of, one kind of base. Alternatively, the at least one base comprises, preferably consists of, two or more kinds of bases. For example, the at least one base comprises, preferably consists of, two or three kinds of bases.

In one embodiment of the present invention, the at least one base is one kind of base.

It is appreciated that the at least one base of step c) of the instant process can be any base that is suitable for adjusting the pH of the aqueous suspension to a pH measured at 25° C. of ≥9.0.

In one embodiment of the present invention, the aqueous suspension of step a) is contacted with the at least one base such that the obtained aqueous suspension has a pH measured at 25° C. of from 10.0 to 13.0 and preferably from 11.0 to 12.5.

The aqueous suspension is contacted before and/or during and/or after pre-heating step b) and/or before and/or during and/or after wet-grinding step d) with the at least one base. Preferably, the aqueous suspension is contacted before and/or during pre-heating step b) and/or before wet-grinding step d) with the at least one base. More preferably, the aqueous suspension is contacted before or during pre-heating step b) or before wet-grinding step d) with the at least one base.

In one embodiment of the present invention, the aqueous suspension is contacted before and/or during pre-heating step b) with the at least one base. For example, the aqueous suspension is contacted before or during pre-heating step b) with the at least one base. Alternatively, the aqueous suspension is contacted before and during pre-heating step b) with the at least one base.

Preferably, the aqueous suspension is contacted during pre-heating step b) with the at least one base.

It is appreciated that the term "before pre-heating step b)" refers to the time period in which the aqueous suspension of step a) has room temperature or an elevated temperature already obtained from previous processing steps at ambient pressure and the heating up of the suspension to the desired pre-heating temperature has not yet started. The term "during pre-heating step b)" refers to the time period in which the aqueous suspension of step a) is heated up to the pre-heating temperature of from 40 to 95° C. at ambient pressure. The term "after pre-heating step b)" refers to the time period after which the aqueous suspension has reached the pre-heating temperature of from 40 to 95° C. at ambient pressure. The term "before wet-grinding step d)" refers to the time period before which the wet-grinding of step d) has started. The term "during wet-grinding step d)" refers to the time period in which the aqueous suspension of step b) or of step c) is wet-ground. The term "after wet-grinding step d)" refers to the time period after which the wet-grinding of the aqueous suspension of step b) or of step c) has been stopped.

In one embodiment of the present invention, the at least one base is added in contacting step c) in an amount of ≥0.05 wt.-%, preferably of ≥0.1 wt.-%, more preferably of ≥0.2 wt.-% and most preferably of from 0.2 to 1.0 wt.-%, based on the total dry weight of the calcium carbonate-containing material.

For the sake of completeness, it is to be noted that the amount of the at least one base is calculated as active material on dry matter calcium carbonate-containing material.

Additionally or alternatively, it is preferred that the at least one base of contacting step c) is at least one alkali metal hydroxide and/or at least one earth alkali metal hydroxide.

If the at least one base is at least one alkali metal hydroxide, the at least one alkali metal hydroxide is selected from the group comprising lithium hydroxide, sodium hydroxide, potassium hydroxide and mixtures thereof. In one embodiment of the present invention, the at least one alkali metal hydroxide is preferably selected from sodium hydroxide and/or potassium hydroxide. For example, the at least one alkali metal hydroxide is sodium hydroxide or potassium hydroxide. It is preferred that the at least one alkali metal hydroxide is sodium hydroxide.

If the at least one base is at least one earth alkali metal hydroxide, the at least one earth alkali metal hydroxide is selected from the group comprising magnesium hydroxide, calcium hydroxide and mixtures thereof. For example, the at least one earth alkali metal hydroxide is magnesium hydroxide or calcium hydroxide. It is preferred that the at least one earth alkali metal hydroxide is calcium hydroxide.

In one embodiment of the present invention, the at least one base of contacting step c) is sodium hydroxide.

The at least one base can be provided in step c) in an aqueous environment or as a dry material. In one embodiment of the present invention, the at least one base is provided in step c) in an aqueous environment. For example, the at least one base is provided in step c) in an aqueous environment comprising, preferably consisting of, water.

The term "aqueous environment" refers to a system comprising, preferably consisting of, water. For example, the aqueous environment consists of water. If the aqueous environment consists of water, the water to be used can be any water available such as process water, such as process water coming from water treatment systems, and/or tap water and/or deionised water. The aqueous environment is preferably free of dispersants and suspended solid materials. In one embodiment of the present invention, the aqueous environment is preferably free of materials being reactive towards calcium carbonate-containing materials.

If the at least one base is added to the aqueous suspension in an aqueous environment, the aqueous environment comprising, preferably consisting of, the at least one base has preferably an elevated temperature as an aqueous environment having room temperature may inversely affect the time required for pre-heating the aqueous suspension. Therefore, the temperature of the aqueous environment comprising, preferably consisting of, the at least one base used in contacting step c) should preferably be above room temperature but equal to or below the temperature used in pre-heating step b). Alternatively, the temperature of the aqueous environment comprising, preferably consisting of, the at least one base used in contacting step c) is of about room temperature, i.e. such as from 20 to 24° C.

Preferably, the aqueous suspension of step a) is contacted with the at least one base being a dry material.

In one embodiment of the present invention, the aqueous suspension of step a) is contacted with the at least one base in one or several portions. If the at least one base is added in several portions, the aqueous suspension of step a) is contacted with the at least one base preferably in two to five portions, more preferably in two to four portions, even more preferably in two to three portions and most preferably in two portions.

It is appreciated that the aqueous suspension of step a) is contacted with the at least one base preferably in one portion.

Characterization of Step d): Wet-Grinding the Pre-Heated Aqueous Suspension

According to step d) of the process of the present invention, the pre-heated suspension of step b) or of step c) is wet-ground in at least one grinding step for obtaining an aqueous suspension of at least one calcium carbonate-containing material having a ratio of particles having an average particle size $d_{80}$ value to particles having an average particle size $d_{20}$ value $[d_{80}/d_{20}]$ of ≤2.50.

Preferably, the pre-heated suspension of step c) is wet-ground in at least one grinding step for obtaining an aqueous suspension of at least one calcium carbonate-containing material having a ratio of particles having an average particle size $d_{80}$ value to particles having an average particle size $d_{20}$ value $[d_{80}/d_{20}]$ of ≤2.50.

In general, wet-grinding step d) can be carried out with any conventional grinding device known to the skilled man. For example, wet-grinding step d) can be performed by using a bead or media mill, such as a vertical or horizontal bead mill or vertical or horizontal media mill, and/or other such processes known to the skilled man.

In one embodiment of the present invention, the grinding device, such as a vertical bead mill, comprises grinding media. For example, the grinding device is filled with grinding media in an amount of at least 10.0 vol. %, preferably at least 50.0 vol.-%, more preferably from 50.0 to 80.0 vol.-% and most preferably from 60.0 to 80.0 vol.-%, such as about 70.0 vol.-%, based on the total volume of the grinding device.

The wet-grinding can be performed by using a great variety of grinding media. For example, the grinding media can be made up of ceramic media, zirconia ($ZrO_2$), ceria-stabilized high dense grinding media, glass or mixtures thereof. In one embodiment of the present invention, the grinding media is made up of ceramic media or ceria-stabilized high dense grinding media with a specific gravity of greater or equal than about 5 $g/cm^3$.

Additionally or alternatively, the grinding media may have a specific diameter. For example, the grinding media have a weight median particle size diameter $d_{50}$ of 0.1 to 2.5 mm, preferably of 0.2 to 2.0 mm and most preferably of 0.3 to 1.6 mm.

Additionally or alternatively, the grinding media may have a specific density. For example, the grinding media may have a density of 3.0 to 10.0 $g/cm^3$, preferably of 4.0 to 8.0 $g/cm^3$ and most preferably of 5.0 to 7.0 $g/cm^3$.

It is appreciated that wet-grinding step d) is preferably carried out until the at least one calcium carbonate-containing material has the desired fineness.

For example, wet-grinding step d) is carried out until at least 25.0 wt.-%, preferably at least 30.0 wt.-% of the at least one calcium carbonate-containing material has a weight median particle size diameter of ≤1.0 μm. In one embodiment of the present invention, wet-grinding step d) is carried out until at least 40.0 wt.-%, preferably at least 50.0 wt.-%, more preferably at least 60.0 wt.-% and most preferably at least 70.0 wt.-% of the at least one calcium carbonate-containing material has a weight median particle size diameter of ≤1.0 μm.

The starting temperature of wet-grinding step d), i.e. of the aqueous suspension, preferably corresponds to the temperature of the pre-heated suspension obtained in step b).

Accordingly, it is appreciated that wet-grinding step d) is preferably carried out at a starting temperature of from 40 to 95° C., preferably from 60 to 80° C., more preferably from 65 to 75° C., such as about 70° C.

The temperature can preferably be controlled and maintained at said starting temperature while step d) is carried out. In this respect, it is to be noted that the term "the temperature is maintained" during said process step in the meaning of the present invention relates to a temperature which does preferably not exceed the starting temperature by more than 5° C.; i.e. if the starting temperature is for example adjusted to a temperature of 40° C., the temperature during process step d) may not exceed 45° C.

Alternatively, the starting temperature of process step d) is allowed to rise while wet-grinding step d) is carried out. However, due to the dissipation-/friction heat generated during wet-grinding the temperature of the mixture may rise to temperatures of 90° C. and more. The maximum temperature at the mill outlet in this embodiment of the process is preferably about the boiling point of water and most preferably the maximum temperature reached during step d) is about 100° C. at ambient pressure. For example, the maximum temperature reached during process step d) is preferably between 80 and 99° C.

The aqueous suspension comprising at least one calcium carbonate-containing material obtained in wet-grinding step d) preferably has solids content of from 5.0 wt.-% to 60.0 wt.-%, preferably from 10.0 wt.-% to 55.0 wt.-%, more preferably from 15.0 wt.-% to 50.0 wt.-% and most preferably from 20.0 wt.-% to 50.0 wt.-%, based on the total weight of the aqueous suspension.

In the case where the obtained aqueous suspension has a solid contents of the at least one calcium carbonate-containing material above or below the desired range the aqueous suspension may be diluted with water or up-concentrated by any conventional process known to the skilled person to obtain a suspension of said desired solid content.

In one embodiment of the present invention, the aqueous suspension comprising at least one calcium carbonate-containing material obtained in wet-grinding step d) preferably has a pH measured at 25° C. of ≥9.0, preferably from 10.0 to 13.0 and most preferably from 11.0 to 12.5.

The time required for carrying out the instant process is the time required to almost complete the transformation of the at least one calcium carbonate-containing material into the at least one calcium carbonate-containing material featuring the desired characteristics. Such almost complete transformation of the of the at least one calcium carbonate-containing material is preferably obtained within 2 hours, more preferably within 1 hour, still more preferably within 45 min, even more preferably within 30 min and most preferably within 20 min, calculated from the start of wet-grinding the pre-heated aqueous suspension comprising the at least one calcium carbonate-containing material in the presence of the at least one base.

In one embodiment of the present invention, the instant process does not comprise further process steps in addition to process steps a), b), c) and d), i.e. the instant process consists of process steps a), b), c) and d).

In another embodiment of the present invention, the obtained aqueous suspension comprising at least one calcium carbonate-containing material may further comprise process step e) of storing the aqueous suspension obtained in wet-grinding step d).

It is appreciated that the aqueous suspension comprising at least one calcium carbonate-containing material obtained in wet-grinding step d) can be directly used, i.e. without further process steps between step d) and e), for storing. Accordingly, the aqueous suspension stored in step e) preferably has solids content of from 5.0 wt.-% to 60.0 wt.-%, preferably from 10.0 wt.-% to 55.0 wt.-%, more preferably from 15.0 wt.-% to 50.0 wt.-% and most preferably from 20.0 wt.-% to 50.0 wt.-%, based on the total weight of the aqueous suspension.

If the instant process comprises storing step e), the storing is preferably carried out at elevated temperature. Preferably, the aqueous suspension obtained in wet-grinding step d) is stored in step e) at a temperature of from 70 to 140° C., preferably from 75 to 140° C. and most preferably from 80 to 99° C.

Additionally or alternatively, the storing is preferably carried out for a sufficient long period of time allowing a complete transformation of the at least one calcium carbonate-containing material to the desired crystal morphology. Thus, if the instant process comprises storing step e), the aqueous suspension obtained in step d) is preferably stored for a period of time of ≤5 hours, preferably ≤2 hours, more preferably ≤60 minutes, most preferably ≤45 minutes, such as from 5 minutes to 2 hours. For example, if the instant process comprises storing step e), the aqueous suspension obtained in step d) is stored for a period of time of 1 to 2 hours.

It is preferred that the instant process is performed without process step e).

For obtaining a weakly alkaline aqueous suspension comprising at least one calcium carbonate-containing material, the aqueous suspension may be, after wet-grinding step d) or, if present, after storing step e), treated with at least one acid such as to obtain an aqueous suspension comprising at least one calcium carbonate-containing material having a pH measured at 25° C. of ≤10.5, preferably from 8.0 to 10.5 and most preferably from 8.5 to 10.0.

It is to be noted that the aqueous suspension comprising at least one calcium carbonate-containing material is only treated with at least one acid after grinding step d) as long as the process is performed without storing step e). In other words, if the instant process comprises storing step e), the aqueous suspension comprising at least one calcium carbonate-containing material is treated with at least one acid only after storing step e).

The term "at least one" acid in the meaning of the present invention means that the acid comprises, preferably consists of, one or more kinds of acids.

In one embodiment of the present invention, the at least one acid comprises, preferably consists of, one kind of acid. Alternatively, the at least one acid comprises, preferably consists of, two or more kinds of acids. For example, the at least one acid comprises, preferably consists of, two or three kinds of acids.

In one embodiment of the present invention, the at least one acid is one kind of acid.

The term "acid" in the meaning of the present invention refers to an acid in accordance with the Brønsted-Lowry concept.

It is appreciated that the at least one acid that may be added to the aqueous suspension of the instant process can be any acid that is suitable for adjusting the pH of the aqueous suspension to a pH measured at 25° C. of ≤10.0.

For example, the at least one acid is selected from the group comprising phosphoric acid, citric acid, carbonic acid, hydrochloric acid, dispersing agent, such as sodium and/or potassium and/or ammonium salts of at least partly neutralized homopolymers or copolymers of acrylic acid or maleic acid, and mixtures thereof.

If the at least one acid is a dispersing agent, the aqueous suspension obtained from the instant process is preferably dewatered and then rediluted with water in the presence of the dispersing agent. Dispersing agents are well known to the skilled person and are available from a great variety of sources.

In one embodiment of the present invention, the aqueous suspension comprising at least one calcium carbonate-containing material is free of chelating agents and/or conjugated bases.

Additionally or alternatively, the aqueous suspension comprising at least one calcium carbonate-containing material obtained in wet-grinding step d) or optional storing step e) can be dried or dewatered in process step f), optionally up to the point of obtaining a partially dewatered calcium carbonate-containing material or an essentially completely dried calcium carbonate-containing material in case more than 99.0 wt.-% of water, based on the total weight of water, is removed from the aqueous suspension.

The term "essentially completely dried" is understood to refer to a calcium carbonate-containing material having a total surface moisture content of less than 3.0 wt.-%, preferably less than 2.0 wt.-%, more preferably less than 1.5 wt.-% and most preferably of less than 1.0 wt.-%, based on the total weight of the calcium carbonate-containing material, measured within 12 hours after drying. In one embodiment of the present invention, the calcium carbonate-containing material has a total surface moisture content of less than 0.8 wt.-%, preferably less than 0.7 wt.-% and most preferably of less than 0.6 wt.-%, based on the total weight of the calcium carbonate-containing material, measured within 12 hours after drying. For example, the calcium carbonate-containing material has a total surface moisture content of less than 0.5 wt.-%, based on the total weight of the calcium carbonate-containing material, measured within 12 hours after drying. For the purpose of the present invention, the term "total surface moisture content" refers to the amount of water absorbed on the surface of the calcium carbonate-containing material and the pores within the calcium carbonate-containing material. The wt.-% water of the present invention is determined by moisture loss in an oven at 105° C. for 2 hours or thermogravimetrically in a thermogravimetric moisture analyzer, such as Mettler Toledo HB43, with halogen heating to a temperature between 105 and 160° C.

If the aqueous suspension described above is partially dewatered, the partially dewatered calcium carbonate-containing material obtained in step f) is preferably in form of an aqueous suspension having high solids content, i.e. the solids content is above the solids content of the aqueous suspension obtained after wet-grinding step d) or optional storing step e) of the instant process. For example, the partially dewatered calcium carbonate-containing material obtained in step f) is in form of an aqueous suspension having solids content from 20.0 to 70.0 wt.-%, preferably from 25.0 to 65.0 wt.-%, and most preferably from 30.0 to 60.0 wt.-%, based on the total weight of the aqueous suspension.

If the aqueous suspension described above is essentially completely dried, the solids (i.e. dry or containing as little water that it is not in a fluid form) of calcium carbonate-containing material obtained in step f) can be in the form of granules or a powder.

In the case of an essentially completely dried product and/or a partially dewatered calcium carbonate-containing material, the product and/or material can additionally be treated with an aliphatic linear or branched carboxylic acid. For example, the essentially completely dried calcium carbonate-containing material and/or partially dewatered calcium carbonate-containing material can be treated with an aliphatic linear or branched carboxylic acid having between 5 and 24 carbon atoms during and/or before and/or after drying.

Preferably, the essentially completely dried calcium carbonate-containing material and/or partially dewatered calcium carbonate-containing material is treated with an aliphatic linear or branched carboxylic acid having between 5 and 24 carbon atoms before or after drying. More preferably, the essentially completely dried calcium carbonate-containing material and/or partially dewatered calcium carbonate-containing material is treated with an aliphatic linear or branched carboxylic acid having between 5 and 24 carbon atoms before drying.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

It is preferred that the partially dewatered calcium carbonate-containing material and/or essentially completely dried calcium carbonate-containing material is treated before or after dewatering or drying step f) with the at least one saturated aliphatic linear or branched carboxylic acid to obtain a hydrophobized calcium carbonate-containing material. For example, the partially dewatered calcium carbonate-containing material or the essentially completely dried calcium carbonate-containing material is treated before or after dewatering or drying step f) with the at least one saturated aliphatic linear or branched carboxylic acid to obtain a hydrophobized calcium carbonate-containing material.

In one embodiment of the present invention, the partially dewatered calcium carbonate-containing material or essentially completely dried calcium carbonate-containing material is treated before dewatering or drying step f) with the at least one saturated aliphatic linear or branched carboxylic acid to obtain a hydrophobized calcium carbonate-containing material. Preferably, the partially dewatered calcium carbonate-containing material is treated before dewatering step f) with the at least one saturated aliphatic linear or branched carboxylic acid to obtain a hydrophobized calcium carbonate-containing material.

Alternatively, the partially dewatered calcium carbonate-containing material and/or the essentially completely dried calcium carbonate-containing material is treated after dewatering or drying step f) with the at least one saturated aliphatic linear or branched carboxylic acid to obtain a hydrophobized calcium carbonate-containing material.

In one embodiment of the present invention, the partially dewatered calcium carbonate-containing material or the essentially completely dried calcium carbonate-containing material is treated after dewatering or drying step f) with the at least one saturated aliphatic linear or branched carboxylic acid to obtain a hydrophobized calcium carbonate-containing material. For example, the essentially completely dried calcium carbonate-containing material is treated after drying step f) with the at least one saturated aliphatic linear or branched carboxylic acid to obtain a hydrophobized calcium carbonate-containing material.

Additionally or alternatively, the partially dewatered calcium carbonate-containing material can be treated with at least one dispersing agent after dewatering step f). For example, the partially dewatered calcium carbonate-containing material to be treated with the at least one dispersing agent may be in the form of an aqueous suspension having solids content of ≤40.0 wt.-%, such as from 5.0 to 40.0 wt.-%, based on the total weight of the aqueous suspension. Alternatively, the partially dewatered calcium carbonate-containing material to be treated with the at least one dispersing agent may be in the form of a filter cake having solids content of from 50.0 to 85.0 wt.-%, based on the total weight of the filter cake.

Dispersing agents suitable for dispersing such partially dewatered calcium carbonate-containing materials are well known to the skilled person. For example, the dispersing agent can be selected from sodium and/or potassium and/or ammonium salts of at least partly neutralized homopolymers or copolymers of acrylic acid or maleic acid, such as sodium polyacrylate having a molecular weight $M_w$ of from 4 000 to 10 000 g/mol, preferably from 4 000 to 8 000 g/mol and most preferably of about 6 000 g/mol, sodium hydrogen phosphate, carboxymethylcellulose (CMC), methyl methacrylate, steric, low charge (mirror) dispersants and mixtures thereof. In one embodiment of the present invention, the dispersing agent is a mixture of sodium polyacrylate and sodium hydrogen phosphate.

If the partially dewatered calcium carbonate-containing material is treated with a dispersing agent, the dispersing agent is preferably present in a total amount of from 0.05 to 2.0 wt.-%, more preferably from 0.1 to 1.5 wt.-% and most preferably from 0.3 to 1.0 wt.-%, based on the total dry weight of the at least one calcium carbonate-containing material. It is to be noted that the amount of the dispersing agent is calculated as active material on dry matter calcium carbonate-containing material.

Additionally or alternatively, the partially dewatered calcium carbonate-containing material and/or the essentially completely dried calcium carbonate-containing material may be rediluted with water such as to obtain an aqueous suspension comprising the at least one calcium carbonate-containing material.

If the partially dewatered calcium carbonate-containing material and/or the essentially completely dried calcium carbonate-containing material is rediluted with water, the obtained aqueous suspension preferably has solids content from 10.0 to 80.0 wt.-%, preferably from 15.0 to 80.0 wt.-%, and most preferably from 20.0 to 78.0 wt.-%, based on the total weight of the aqueous suspension.

In one embodiment of the present invention, the partially dewatered calcium carbonate-containing material and/or the essentially completely dried calcium carbonate-containing material is rediluted with water such as to obtain an aqueous suspension having solids content from 50.0 to 80.0 wt.-%, preferably from 60.0 to 80.0 wt.-%, and most preferably from 65.0 to 78.0 wt.-%, based on the total weight of the aqueous suspension.

For example, the partially dewatered calcium carbonate-containing material and/or the essentially completely dried calcium carbonate-containing material can be rediluted with water such as to obtain an aqueous suspension having solids content from 65.0 to 75.0 wt.-%, based on the total weight of the aqueous suspension.

Thus, it is appreciated that the aqueous suspension obtained by rediluting the partially dewatered calcium carbonate-containing material and/or the essentially completely dried calcium carbonate-containing material may comprise at least one saturated aliphatic linear or branched carboxylic acid or is free of saturated aliphatic linear or branched carboxylic acids. Accordingly, the calcium carbonate-containing material can be a hydrophobized calcium carbonate-containing material, i.e. obtained by treating the at least one calcium carbonate-containing material with at least one saturated aliphatic linear or branched carboxylic acid.

In one embodiment of the present invention, the aqueous suspension obtained by rediluting the partially dewatered calcium carbonate-containing material may comprise a dispersing agent or is free of dispersing agents. Accordingly, the calcium carbonate-containing material can be a dispersed or undispersed material.

In one embodiment of the present invention, the calcium carbonate-containing material obtained after process step f) is a dispersed material.

The calcium carbonate-containing material obtained by the instant process is characterized by a specific narrow particle size distribution, i.e. a steepness factor expressed by the ratio of particles having an average particle size $d_{80}$ value to particles having an average particle size $d_{20}$ value $[d_{80}/d_{20}]$.

It is appreciated that the at least calcium carbonate-containing material obtained by the instant process has a ratio of particles having an average particle size $d_{80}$ value to particles having an average particle size $d_{20}$ value $[d_{80}/d_{20}]$ of ≤2.50.

In one embodiment of the present invention, the at least calcium carbonate-containing material obtained by the instant process has a ratio of particles having an average particle size $d_{80}$ value to particles having an average particle size $d_{20}$ value $[d_{80}/d_{20}]$ of from 1.50 to 2.50, preferably from 1.70 to 2.50 and most preferably from 2.00 to 2.50.

It is preferred that such steepness factor is obtained for the at least one calcium carbonate-containing material in step d). It is to be noted that the steepness factor is not changing if optional process steps e) and/or f) is/are implemented in the process and thus the at least one calcium carbonate-containing material obtained after optional process step e) and/or step f) also has a steepness factor as outlined above, i.e. a ratio of particles having an average particle size $d_{80}$ value to particles having an average particle size $d_{20}$ value $[d_{80}/d_{20}]$ of ≤2.50, preferably from 1.50 to 2.50, more preferably from 1.70 to 2.50 and most preferably from 2.00 to 2.50.

Preferably, the at least one calcium carbonate-containing material obtained by the instant process has a lower ratio of particles having an average particle size $d_{80}$ value to particles having an average particle size $d_{20}$ value $[d_{80}/d_{20}]$ than a calcium carbonate-containing material that is obtained by wet-grinding the same suspension of step a) to similar particle size but without pre-heating step b) and contacting step c).

Additionally, the at least calcium carbonate-containing material obtained by step d) of the instant process can have a ratio of particles having an average particle size $d_{90}$ value to particles having an average particle size $d_{10}$ value $[d_{90}/d_{10}]$ of δ4.50.

For example, the at least calcium carbonate-containing material obtained by the instant process has a ratio of particles having an average particle size $d_{90}$ value to particles having an average particle size $d_{10}$ value $[d_{90}/d_{10}]$ of from 3.00 to 4.50, preferably from 3.20 to 4.50 and most preferably from 3.50 to 4.50.

Additionally or alternatively, the at least one calcium carbonate-containing material obtained after optional process step e) and/or step f) also has a steepness factor as outlined above, i.e. a ratio of particles having an average particle size $d_{90}$ value to particles having an average particle size $d_{10}$ value $[d_{90}/d_{10}]$ of ≤4.50, preferably from 3.00 to 4.50, more preferably from 3.20 to 4.50 and most preferably from 3.50 to 4.50.

In one embodiment of the present invention, the at least one calcium carbonate-containing material obtained by the instant process has a lower ratio of particles having an average particle size $d_{90}$ value to particles having an average particle size $d_{10}$ value $[d_{90}/d_{10}]$ than a calcium carbonate-containing material that is obtained by wet-grinding the same suspension of step a) to similar particle size but without pre-heating step b) and contacting step c).

It is further appreciated that the at least one calcium carbonate-containing material obtained by the instant process has a low BET specific surface area. Preferably, the at least one calcium carbonate-containing material has a BET specific surface area of ≤15.0 m²/g, preferably in the range from 1.0 to 15.0 m²/g, more preferably from 2.0 to 14.0 m²/g, and most preferably from 3.0 to 13.0 m²/g.

It is to be noted that the BET specific surface area of the at least one calcium carbonate-containing material obtained by the instant process is lower than the BET specific surface area of at least one calcium carbonate-containing material that is obtained by wet-grinding the same suspension of step a) to similar particle size but without pre-heating step b) and contacting step c).

The favourable characteristics of the at least one calcium carbonate-containing material obtained by the instant process, can be also expressed by the normalized SSA which can be calculated by the ratio of BET specific surface area to the weight median particle size diameter $d_{50}$ [SSA/$d_{50}$]. The at least one calcium carbonate-containing material obtained by the instant process preferably has a normalized SSA [SSA/$d_{50}$] of ≤15.0*10⁶ m/g, preferably in the range from 8.0 to 15.0*10⁶ m/g, more preferably in the range from 9.0 to 15.0*10⁶ m/g and most preferably in the range from 10.0 to 15.0*10⁶ m/g.

Additionally or alternatively, the at least one calcium carbonate-containing material obtained after optional process step e) and/or step f) also has a normalized SSA as outlined above, i.e. a normalized SSA [SSA/$d_{50}$] of ≤15.0*10⁶ m/g, preferably in the range from 8.0 to 15.0*10⁶ m/g, more preferably in the range from 9.0 to 15.0*10⁶ m/g and most preferably in the range from 10.0 to 15.0*10⁶ m/g.

In one embodiment of the present invention, the at least one calcium carbonate-containing material obtained by the instant process has a lower normalized SSA than a calcium carbonate-containing material that is obtained by wet-grinding the same suspension of step a) to similar particle size but without pre-heating step b) and contacting step c).

In view of the good results obtained, a further aspect of the present invention is directed to a calcium carbonate-containing material having a ratio of particles having an average particle size $d_{80}$ value to particles having an average particle size $d_{20}$ value $[d_{80}/d_{20}]$ of ≤2.50. It is one requirement of the instant invention that the calcium carbonate-containing material is obtained by a process as defined above, i.e. process steps a), b), c), d) and optional process steps e) and/or f).

It is preferred that the calcium carbonate-containing material is in the form of a partially dewatered or essentially completely dried calcium carbonate-containing material. In particular, the partially dewatered or essentially completely dried calcium carbonate-containing material is obtained by drying or dewatering the aqueous suspension comprising the at least one calcium carbonate-containing material obtained in step d) and optional process steps e) and/or f) of the process of the present invention. Optionally, the partially dewatered or essentially completely dried calcium carbonate-containing material is further treated with at least one dispersing agent and rediluted to obtain an aqueous suspension and/or treated with at least one saturated aliphatic linear or branched carboxylic acid.

With regard to the definition of the aqueous suspension, the calcium carbonate-containing material and preferred embodiments thereof, reference is made to the comments provided above when further discussing the aqueous suspension comprising the at least one calcium carbonate-containing material obtained in step d) and optional process steps e) and/or f) of the process of the present invention.

The calcium carbonate-containing material thus obtained, either in form of an aqueous suspension comprising the calcium carbonate-containing material and/or in form of a partially dewatered or essentially completely dried calcium carbonate-containing material, and optionally further treated with at least one dispersing agent and rediluted to obtain an aqueous suspension and/or treated with at least one saturated aliphatic linear or branched carboxylic acid, can be used in paper and board applications, in adhesives, preferably moisture-curing adhesives for structural bonding (e.g. wood bonding) and flooring application including parquet adhesives, in cosmetics, in caulks and sealants in paints and coatings, in underbody coatings, for the replacement of precipitated calcium carbonate in common, in fibre applications or in plastics applications.

According to one embodiment of the present invention the use of the products obtained by the inventive processes is preferred in plastic applications such as granulates, pipes, technical profiles, wall panels, ceiling panels, cladding panels, wire or cable insulations, films (e.g. blown films and breathable films, biaxially oriented films, preferably polyethyleneterephthalate-, polyamide-, polyethylene- or polypropylene-comprising films), sheets or fibres.

In the art, many methods for the manufacture of polymer products are known. These methods include, without being limited to, melt processing techniques, for example, profile extrusion (for pipes, sheets and hollow sheets), cable extrusion, film extrusion (for cast films and blown films), molding (e.g., injection molding, rotomolding, blow molding and thermoforming), fibre spinning (e.g., melt spinning, wet spinning, dry spinning and structural fibres), co-kneading and pultrusion. The final articles may provide mono-layer or multi-layer structures.

According to one embodiment of the present invention the products obtained by the inventive process are used for various shaped articles. Examples include flexible packaging for industrial and consumer applications, including roll stocks, bags, pouches, labels, wraps, liddings, shrink sleeves and stretch films; rigid packaging for industrial and consumer applications including plastic bottles, cups and containers; building and construction materials, including pipes and conduits, cladding and profiles, insulations, seals and gaskets, geotextiles; agriculture and horticulture materials including greenhouse materials, mulch films, tunnel, silage, bale wraps, boxes and crates; transportation and automotive applications including interior parts, such as instrument and door panels, consoles, pillars and seating; exterior parts, such as bumper fascia, fenders, tailgates as well as under the hood applications including air ducts, air intake manifolds, radiators and cooling hoses; electrical and electronic applications including CD players, DVD systems, personal computers and TV sets, notebooks, tablets, smartphones, cookers, refrigerators and freezers, washing machines, dishwashers, tools and office equipment; medical and health applications including disposable caps, gowns, masks, scrub suits and shoe covers, drapes, wraps and packs, sponges, dressings and wipes, bed linen, contamination control gowns, examination gowns, lab coats, isolation gowns, diagnostic medical machinery and medical devices; personal care products including absorbent hygiene products (AHP), baby diapers, feminine hygiene products and adult incontinence products, wipes, skin care products, depilatory strips; household and furniture products, including wood composites, decorative foils, floor coverings, flooring, kitchen ware, cleaners, pet care, lawn and garden articles; toys, sports and leisure articles including playhouses, building kits, play vehicles, sports and fitness devices, shoes, clothing and sportswear, safety equipment (helmets, kneepads), sports equipment, and suit cases.

In one embodiment the products obtained by the inventive process are used in PVC-applications like window profiles, pipes, technical profiles such as cable- or wire conducts, wall-, ceiling-, or cladding panels, wire insulations, fibres and non-wovens.

In particular, aqueous suspensions comprising the calcium carbonate-containing material and/or partially dewatered or essentially completely dried calcium carbonate-containing material, and optionally further treated with at least one dispersing agent and rediluted to obtain an aqueous suspension and/or treated with at least one saturated aliphatic linear or branched carboxylic acid, according to the invention are characterized in that they contain the calcium carbonate-containing material obtained by the process of the present invention. The particles of the calcium carbonate-containing material according to the present invention are especially characterized in that they feature an improved or optimized narrow particle size distribution and low BET specific surface area in comparison to calcium carbonate-containing materials prepared by processes of the prior art. In contrast to prior art processes, the foregoing is not achieved by a time-consuming heat-ageing step after wet-grinding but rather through wet-grinding a pre-heated aqueous suspension comprising at least one calcium carbonate-containing material in the presence of at least one base. It is believed that such process results in a calcium carbonate-containing material featuring an improved or optimized narrow particle size distribution and improved or optimized values for the BET specific surface area and thus imparting improved or optimized optical properties such as opacity and brightness and light scattering properties in paper products comprising such material. As another advantage, the at least one calcium carbonate-containing material obtained by the process of the present invention can be prepared in a simple way and without implementing time-consuming process steps.

The following examples may additionally illustrate the invention, but are not meant to restrict the invention to the exemplified embodiments. The examples below show the good characteristics such as particle size distribution and BET specific surface area of the at least one calcium carbonate-containing material prepared according to the present invention.

EXAMPLES

Measurement Methods

The following measurement methods are used to evaluate the parameters given in the examples and claims.

Brookfield Viscosity

The Brookfield-viscosity of a slurry was determined with a Brookfield Viscometer type RVT equipped with a LV-3 spindle at a speed of 100 rpm and room temperature (20±3° C.).

BET Specific Surface Area of a Material

The BET specific surface area is measured via the BET method according to ISO 4652 using nitrogen, following conditioning of the sample by heating at 250° C. for a period of 30 minutes. Prior to such measurements, the sample is filtered, rinsed and dried at 110° C. in an oven for at least 12 hours.

Particle Size Distribution (Mass % Particles with a Size<X) and Average Particle Size ($d_{50}$) of a Particulate Material Throughout the present invention, $d_{50}$ is the weight median particle diameter by weight, i.e. representing the particle size so that 50 wt.-% of the particles are coarser or finer.

The average median particle diameter was measured using the sedimentation method. Particle mass was measured directly via X-ray absorption. The sedimentation method measures the gravity-induced settling rates of different size particles in a liquid with known properties. The measurement is made with a Sedigraph™ III Plus of Micromeritics Instrument Corporation. The method and the instrument are known to the skilled person and are commonly used to determine grain size of fillers and pigments. The measurement was carried out in an aqueous solution of 0.1 wt.-% sodium pyrophosphate-solution ($Na_4P_2O_7$). The samples were dispersed using a high speed stirrer and supersonic.

pH of an Aqueous Suspension

The pH of the aqueous suspension is measured using a standard pH-meter at approximately 25° C.

Solids Content of an Aqueous Suspension

The suspension solids content (also known as "dry weight") is determined using a Moisture Analyser HR73 commercialized by Mettler-Toledo HB43 with the following settings: temperature of 160° C., automatic switch off 3, standard drying, 5-20 g of suspension.

d/d

The term "d/d" refers to the dry amount based on the dry amount of the solid material.

Ash Content

The ash content test was performed by burning 5 to 30 g of the corresponding polymer composition at 570° C. for 120 minutes.

Filter Pressure Value (FPV)

The filter pressure test was performed on a commercially available Collin Pressure Filter Test Teach-Line FT-E20T-IS. The test method was performed in agreement with European Standard EN 13900-5 with each of the corresponding polymer compositions (16 g effective calcium carbonate per 200 g of final sample, diluent: LLDPE ExxonMobil LL 1001 VX) using a 14 µm type 30 filter (GKD Gebr. Kufferath AG, Düren, Germany), wherein no melt pump was used, the extruder speed was kept at 100 rpm, and wherein the melt temperature was 225 to 230° C. (temperature setting: 190° C./210° C./230° C./230° C./230° C.).

Yield Stress

Yield stress determination was performed according to ISO 527-3. The film specimen width was 15 mm and the testing length 5 cm.

Yield Elongation

Yield stress determination was performed according to ISO 527-3. The film specimen width was 15 mm and the testing length 5 cm.

Tensile E-Modulus

Yield stress determination was performed according to ISO 527-3. The film specimen width was 15 mm and the testing length 5 cm. The E-modulus corresponded to the inclination of the tensile test curve between the points at 0.02% and 2% of elongation.

Visual Evaluation of the Blown Film

Film samples have been put under a light microscope. Calcium carbonate agglomerates appear black upon illumination from below and white upon illumination from above. The evaluation "good" means that no pinholes can be observed in the film.

Visual Evaluation of the Breathable Film

The evaluation is done visually during the processing of the visual film without any auxiliary means for enlargement, "ok" means that no holes, no pineholes, and no stripes are observed.

Tear Propagation Resistance

Determination was performed according to ISO 6383.

Dart Drop Test

Measurement was performed according to ASTMD 1709A.

Water Vapour Transmission Rate (WVTR)

The WVTR value of the breathable films was measured with a Lyssy L80-5000 (PBI-Dansensor A/S, Denmark) measuring device according to ASTM E398.

Hydrostatic Pressure Test

The hydrostatic pressure test has been carried out according to a procedure which is equivalent to AATCC Test Method 127-2013, WSP 80.6 and ISO 811. A film sample (test area=10 cm$^2$) was mounted to form a cover on the test head reservoir. This film sample was subjected to a standardized water pressure, increased at a constant rate until leakage appears on the outer surface of the film, or water burst occurs as a result of film failure (pressure rate gradient=100 mbar/min.). Water pressure was measured as the hydrostatic head height reached at the first sign of leakage in three separate areas of the film sample or when burst occurs. The head height results were recorded in centimeters or millibars of water pressure on the specimen. A higher value indicated greater resistance to water penetration. The TEXTEST FX-3000, Hydrostatic Head Tester (Textest AG, Switzerland), was used for the hydrostatic pressure measurements.

Charpy Impact Strength

Charpy notched impact strength was measured according to ISO 179-1:2000 according to conditions 1 eA on V-notched extruded samples which were cut out of the extrudate in machine direction. Measuring conditions: 23° C.±2° C. and 50%±10% relative humidity. The test specimens were prepared by extrusion as described in ISO 3167 Typ A.

Example 1—Comparative Example

The following comparative example illustrates the preparation of a calcium carbonate-containing material by a process of the prior art. Said process is carried out by wet-grinding a dispersing agent free aqueous suspension of calcium carbonate.

An aqueous suspension of a dispersant-free wet-ground natural calcium carbonate (obtained by processing of marble from Omya's quarry in Gummern, Austria) featuring an average particle size of about 2 µm (measured on Sedigraph III Plus from Micromeritics) was adjusted to a solids content of 22.5 wt.-%, based on the total weight of the aqueous suspension, and pre-heated to a temperature of 50° C. for about 30 min.

Subsequently, the resulting pre-heated aqueous suspension was wet-ground in a vertical agitated bead mill that was filled with 70 vol.-%, based on the total volume of the bead mill, with $ZrO_2$-based grinding beads having a $d_{50}$ of 0.45 mm and a density of 6.2 g/cm³.

Volumetric feed rate and rotational speed of the mixing shaft were adjusted to obtain a target fineness after the mill of about 75% finer than 1 µm. Average residence time in the mill was 10.6 minutes. The average residence time was calculated by dividing net volume in the grinding chamber filled with beads (22 liters) by volumetric mill feed rate in liters per minute.

Immediately after wet-grinding, a sample was taken from the mill outlet. Particle size distribution was measured using Sedigraph III Plus and BET specific surface area was measured with Tristar II both supplied by Micromeritics. The wet-ground calcium carbonate directly after the mill had an average particle size $d_{50}$ of 0.64 µm and a BET specific surface area of 12.9 m²/g.

The steepness factor $d_{80}/d_{20}$ was 2.72 and the steepness factor $d_{90}/d_{10}$ was 5.27. The normalized specific surface area, calculated by dividing the measured specific surface area in m²/g by the measured average particle size $d_{80}$ in microns, was 20.2.

Characteristics and further physical properties are given in column A of table 1.

Example 2—Inventive Example

The following illustrative example of the invention involves the preparation of a calcium carbonate-containing material by a process of the invention, i.e. the process is carried out by pre-heating an aqueous suspension of the calcium carbonate-containing material and contacting the calcium carbonate-containing material with sodium hydroxide.

Example 2 was carried out in a similar manner as Example 1, with the difference that prior to wet-grinding the mill feed was heated to about 65° C. Furthermore, 0.5 wt.-% d/d sodium hydroxide, calculated as active on dry matter calcium carbonate, was added to the aqueous suspension. Average residence time in the mill was 12.9 minutes.

The wet-ground calcium carbonate directly after the mill had an average particle size $d_{50}$ of 0.73 µm and a BET specific surface area of 7.6 m²/g.

The steepness factor $d_{80}/d_{20}$ was 2.21 and the steepness factor $d_{90}/d_{10}$ was 3.70. The normalized specific surface area, calculated by dividing the measured specific surface area in m²/g by the measured average particle size $d_{50}$ in microns, was 10.4.

Characteristics and further physical properties are given in column B of table 1.

Example 3—Comparative Example

Example 3 was carried out in a similar manner as Example 1, with the difference that prior to wet-grinding the mill feed was heated to a temperature of about 650 and the target fineness after the mill was set to about 80% finer than 1 µm. Average residence time in the mill was 10.7 minutes.

The wet-ground calcium carbonate directly after the mill had an average particle size $d_{50}$ of 0.63 µm and a BET specific surface area of 9.5 m²/g.

The steepness factor $d_{80}/d_{20}$ was 2.62 and the steepness factor $d_{90}/d_{10}$ was 4.82. The normalized specific surface area, calculated by dividing the measured specific surface area in m²/g by the measured average particle size $d_{50}$ in microns, was 15.1.

Characteristics and further physical properties are given in column C of table 1.

Example 4—Inventive Example

Example 3 was carried out in a similar manner as Example 3, with the difference that prior to wet-grinding 0.5 wt.-% d/d sodium hydroxide, calculated as active on dry matter calcium carbonate, was added to the aqueous suspension. Average residence time in the mill was 12.9 minutes.

The wet-ground calcium carbonate directly after the mill had an average particle size $d_{50}$ of 0.70 µm and a BET specific surface area of 7.7 m²/g.

The steepness factor $d_{80}/d_{20}$ was 2.17 and the steepness factor $d_{90}/d_{10}$ was 3.71. The normalized specific surface area, calculated by dividing the measured specific surface area in m²/g by the measured average particle size $d_{80}$ in microns, was 11.0.

Characteristics and further physical properties are given in column D of table 1.

Example 5—Comparative Example

Example 5 was carried out in a similar manner as Example 1, with the difference that prior to wet-grinding the calcium carbonate suspension was not heated to elevated temperature. The calcium carbonate suspension having a temperature of about room temperature, i.e. about 24° C., was fed to the media mill. The target fineness after the mill was set to about 85% finer than 1 µm. Average residence time in the mill was 12.9 minutes.

The wet-ground calcium carbonate directly after the mill had an average particle size $d_{50}$ of 0.51 µm and a BET specific surface area of 11.0 m²/g.

The steepness factor $d_{80}/d_{20}$ was 3.35 and the steepness factor $do/d_{10}$ was 6.23. The normalized specific surface area, calculated by dividing the measured specific surface area in m²/g by the measured average particle size $d_{50}$ in microns, was 21.6.

Characteristics and further physical properties are given in column E of table 1.

Example 6—Inventive Example

Example 6 was carried out in a similar manner as Example 5, with the difference that prior to wet-grinding 0.5 wt.-% d/d sodium hydroxide, calculated as active on dry matter calcium carbonate, was added to the aqueous suspension. Average residence time in the mill was 22.8 minutes.

The wet-ground slurry after the mill was stored under agitation at a constant temperature of 79° C. for a period of 1 hour. After this storage period, the calcium carbonate in the obtained aqueous suspension had an average particle size $d_{50}$ of 0.57 µm and a BET specific surface area of 8.3 m²/g.

The steepness factor $d_{80}/d_{20}$ was 2.40 and the steepness factor $d_{90}/d_{10}$ was 4.28. The normalized specific surface area, calculated by dividing the measured specific surface area in m²/g by the measured average particle size $d_{50}$ in microns, was 14.6.

Characteristics and further physical properties are given in column F of table 1.

TABLE 1

| | | Example | | | | | |
|---|---|---|---|---|---|---|---|
| | Unit | A CE | B IE | C CE | D IE | E CE | F IE |
| Mill feed temperature | °C. | 50 | 65 | 65 | 65 | 24 | 70 |
| Mill feed pH (@ 25° C.) | | 8.3 | 11.7 | 8.0 | 11.7 | 8.2 | 12.7 |
| feed rate | l/h | 125 | 102 | 123 | 102 | 102 | 58 |
| residence time | min | 10.6 | 12.9 | 10.7 | 12.9 | 12.9 | 22.8 |
| storage after mill | min | 0 | 0 | 0 | 0 | 0 | 60 |
| SSA | m$^2$/g | 12.9 | 7.6 | 9.5 | 7.7 | 11.0 | 8.3 |
| PSD | | | | | | | |
| <5 μm | % | 98 | 98 | 99 | 98 | 98 | 97 |
| <2 μm | % | 93 | 97 | 96 | 96 | 96 | 95 |
| <1 μm | % | 77 | 76 | 80 | 78 | 84 | 86 |
| <0.5 μm | % | 33 | 22 | 34 | 23 | 49 | 40 |
| <0.2 μm | % | 7 | 3 | 7 | 4 | 12 | 4 |
| $d_{50}$ | μm | 0.64 | 0.73 | 0.63 | 0.7 | 0.51 | 0.57 |
| Steepness factor [$d_{80}/d_{20}$] | | 2.72 | 2.21 | 2.62 | 2.17 | 3.35 | 2.40 |
| Steepness factor [$d_{90}/d_{10}$] | | 5.28 | 3.70 | 4.82 | 3.71 | 6.23 | 4.28 |
| normalized SSA (SSA/$d_{50}$) | 10$^6$ m/g | 20.2 | 10.4 | 15.1 | 11.0 | 21.6 | 14.6 |
| Solids content | % | 23.0 | 21.9 | 22.9 | 22.9 | 22.9 | 22.7 |

CE: Comparative example

IE: Inventive Example

Figure 2:
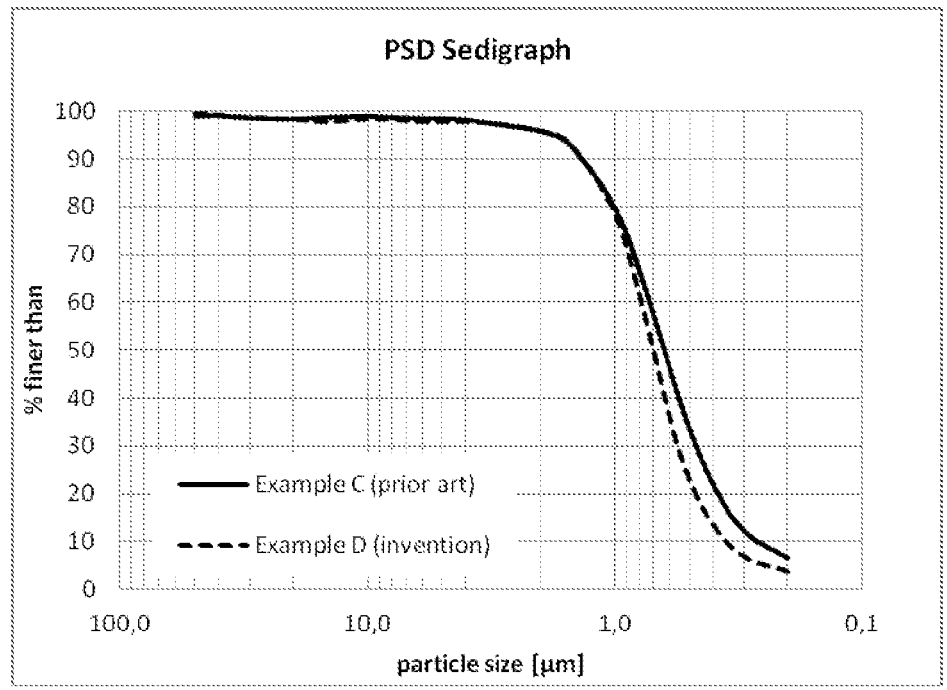
FIG. 2: Comparison of Example C and Example D particle size distribution of a calcium carbonate by PSD sedigraph.
Figure 3:
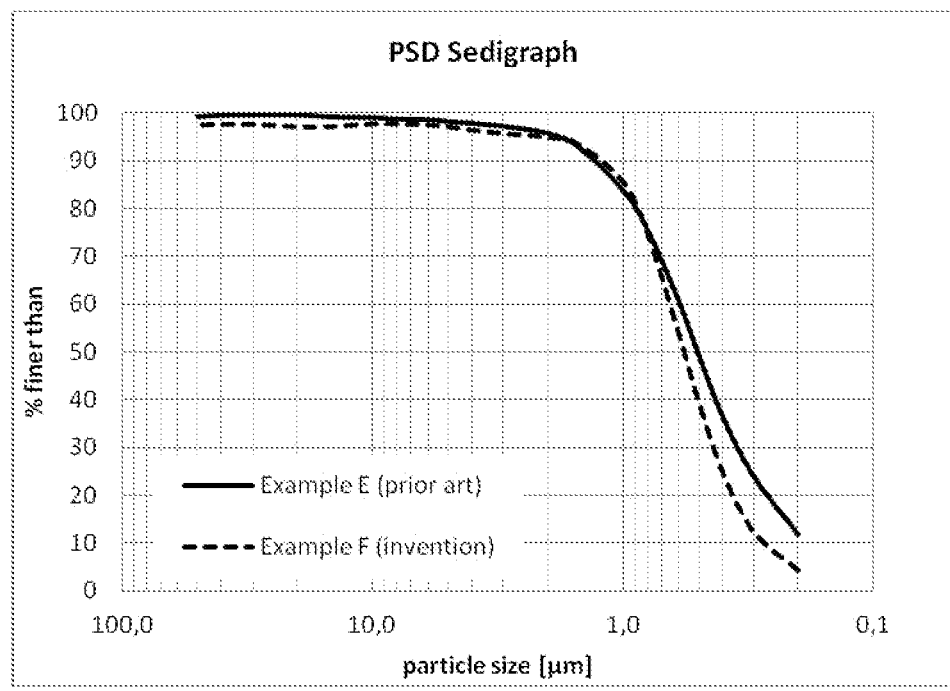
FIG. 3: Comparison of Example E and Example F particle size distribution of a calcium carbonate by PSD sedigraph.

As can be gathered from the data shown in table 1, the inventive method especially leads to a calcium carbonate having a reduced specific surface area and a narrower particle size distribution expressed by the steepness factor $d_{80}/d_{20}$ as well as $d_{90}/d_{10}$ compared to a calcium carbonate obtained by a process of the prior art, i.e. without wet-grinding a pre-heated calcium carbonate suspension in the presence of a base. The favorable narrow particle size distribution of a calcium carbonate obtained by the inventive method compared to the particle size distribution of a calcium carbonate obtained by the corresponding prior art method is also illustrated in FIG. 1 to 3.

Applications in Polymers

Example 7—Preparation of Masterbatches in Polyethylene for Blown Films

Masterbatches containing 30 wt.-% LLDPE LL 6101 Series (Exxon Mobil), and 70 wt.-% CC1 (comparative example, ground calcium carbonate, commercially available from Omya International AG, Switzerland, $d_{50}$: 1.7 μm; $d_{98}$: 6 μm, surface-treated with 1 wt.-% stearic acid, commercially available from Sigma-Aldrich, Croda, based on the total weight of the ground calcium carbonate) or CC2 (inventive example, calcium carbonate according to example D and surface-treated with 1 wt.-% stearic acid, based on the total weight of the ground calcium carbonate, commercially available from Sigma-Aldrich, Croda), respectively, were prepared on a Buss kneader (PR 46 from Buss AG, Switzerland). The compositions and filler contents of the prepared masterbatches are compiled in Table 2 below. The precise filler content was determined by the ash content. Furthermore, a filter pressure test was carried out in order to determine the dispersion quality of the filler material product.

TABLE 2

Compositions and properties of prepared masterbatches.

| Masterbatch | Filler | Ash content [wt.-%] | MFI (190° C., 5 kg) ISO 1133 [g/10 min] | FPV at 14 μm [bar/g] |
|---|---|---|---|---|
| MB1 (comparative) | CC1 | 69.1 | 23.4 | 0.6 |
| MB2 (inventive) | CC2 | 69.7 | 22.8 | 0.8 |

The results shown in Table 2 confirm that masterbatches with good quality were produced.

Example 8—Manufacture of Blown Film Samples

A blown film having a filler content of 20 wt.-% was produced using 71.4 wt.-% of LLDPE LL 6101 Series (Exxon Mobil) and 28.6 wt.-% of a masterbatch according to the above examples (BF1=Comparative Example, BF2=Inventive Example). Films were produced on a Dr. Collin blown film extrusion line (60 mm circular die, 1.2 mm die gap, 30 mm screw diameter, L/D ratio=30, screw with mixing element). The films were processed with a BUR (blow up ratio) of 2.2 and the frost line high was kept at 16 cm high (distance from die).

The extruder had the following configuration:

TABLE 3

Extruder configuration.

| Zone | 1 | 2 | 3 | 4 | 5 |
|---|---|---|---|---|---|
| T [° C.] | 175 | 195 | 215 | 215 | 215 |

Extruder speed was kept constantly at 60 rpm and the average film grammage was set to 35 g/m$^2$ by appropriate adjustment of the line speed. Also the cooling air flow was adjusted accordingly to keep the frost line at the same position.

Material and Mechanical Properties of Blown Film Samples:

TABLE 4

Material and mechanical properties of blown film samples BF1 and BF2.

| Blown film sample | Direction[a] | BF1 | BF2 |
|---|---|---|---|
| Yield stress [N · mm$^{-2}$] | MD | 10.1 | 10.5 |
| | CD | 10.8 | 11.0 |
| Yield elongation [%] | MD | 10.9 | 12.4 |
| | CD | 7.6 | 8.6 |
| Tensile modulus [N · mm$^{-2}$] | MD | 301 | 321 |
| | CD | 349 | 365 |
| Tear propagation resistance [cN] | MD | 650 | 709 |
| | CD | 779 | 917 |
| | Σ | 1429 | 1626 |
| Dart drop fall weight [g] | — | 657 | 851 |
| Visual evaluation of film | — | good | good |
| Ash content [wt.-%] | — | 19.0 | 18.3 |
| Film thickness [μm] | — | 34 | 35 |

MD = machine direction, CD = cross direction.

As can be gathered from Table 4 the films comprising the filler according to present invention show improved mechanical properties.

Example 9—Preparation of Polyolefin Masterbatches for Breathable Films

The following polyolefins have been used for the preparation of masterbatches.

P1: LLDPE Dowlex 2035 (MFR: 6 g/10 min (190° C., 2.16 kg), density: 0.919 g/cm$^3$ according to technical data sheet), commercially available from The Dow Chemical Company, USA.

P2: LDPE Dow SC 7641 (MFR: 2 g/10 min (190° C., 2.16 kg), density: 0.923 g/cm$^3$ according to technical data sheet), commercially available from The Dow Chemical Company, USA.

Masterbatches containing 45 wt.-% P1, 5 wt.-% P2, and 50 wt.-% CC1 (comparative example, ground calcium carbonate, commercially available from Omya International AG, Switzerland, $d_{50}$: 1.7 μm; $d_{98}$: 6 μm, surface-treated with 1 wt.-% stearic acid, commercially available from Sigma-Aldrich, Croda, based on the total weight of the ground calcium carbonate) or CC2 (inventive, according to example D and coated with 1 wt.-% stearic acid, based on the total weight of the calcium carbonate, commercially available from Sigma-Aldrich, Croda,), respectively, were continuously prepared on Buss kneader (PR46 from Buss AG, Switzerland). The compositions and filler contents of the prepared masterbatches are compiled in Table 5 below. The precise filler content was determined by the ash content.

TABLE 5

Compositions and properties of prepared masterbatches.

| Masterbatch | Filler | Ash content [wt.-%] |
|---|---|---|
| MB1 (comparative) | CC1 | 48.9 |
| MB2 (inventive) | CC2 | 49.7 |

Example 10—Preparation of Breathable Films

Breathable films were produced by a pilot-extrusion cast-film line with integrated MDO-II unit (Dr. Collin GmbH, Germany) the extruder temperature settings were 195° C.-210° C.-230° C.-230° C., and the rotation speed of the extruder was approximately 35 rpm using the masterbatches of Example 3. The roller speed of the stretching unit was 135/135%.

The film quality of the obtained breathable films was inspected visually and the films were tested regarding their water vapour transmission rate (WVTR) and their hydrostatic pressure. The results are shown in Table 6 below.

TABLE 6

Compositions and properties of prepared breathable films.

| Sample | Master-batch | Film quality | WVTR | Hydrostatic pressure |
|---|---|---|---|---|
| 1 comparative) | MB1 | ok | 3850 g//m$^2$ × day) | 330 mbar |
| 2 (inventive) | MB2 | ok | 4500 g/(m$^2$ × day) | 370 mbar |

The results shown in Table 6 confirm that the inventive breathable film has a good quality and breathability, which is superior to the comparative breathable film.

Example 11—Preparation and Testing of PVC-Samples

The components for comparative examples PVC1, as well as inventive examples PVC2 were previously mixed using the usual hot/cold mixing process known to the skilled person, and extruded on a Krauss-Maffei KMD 2-90 profile extrusion line, L/D=22, with counter rotating parallel twin screws, the screws having a diameter of 90 mm each.

TABLE 7

Compositions and properties of prepared PVC compounds.

| Example | PVC1 | PVC2 |
|---|---|---|
| PVC resin, K-value 66 (Evipol SH6630) | 100 (phr) | 100 (phr) |
| Acrylic impact modifier (Paraloid KM370) | 6 (phr) | 6 (phr) |
| Ca—Zn containing stabilizer (Stabilox CZ 2913 GN) | 4.65 (phr) | 4.65 (phr) |
| Titanium dioxide (Kronos 2220) | 3.5 (phr) | 3.5 (phr) |
| CaCO$_3$[a] | 8 (phr) | 0 |
| CaCO3 according to Example D | 0 | 8 (phr) |
| Charpy impact strength [kJ/m$^2$] ISO179/1fC | 49.4 | 61.3 |
| Gloss 60°[—] | 50.5 | 54.3 |
| L*-value | 95.2 | 95.4 |
| a*/b* -value | −0.45/3.92 | −0.61/3.62 |

[a]Ground calcium carbonate, commercially available from Omya AG, Switzerland, particle size $d_{50}$: 0.8 μm; top cut $d_{98}$: 5.0 μm.

TABLE 8

Compositions and properties of prepared PVC compounds.

| Example | PVC1 | PVC2 |
|---|---|---|
| PVC resin, K-value 66 (Evipol SH6630) | 100 (phr) | 100 (phr) |
| Acrylic impact modifier (Paraloid KM370) | 6 (phr) | 6 (phr) |
| Ca—Zn containing stabilizer (Stabilox CZ 2913 GN) | 4.65 (phr) | 4.65 (phr) |

TABLE 8-continued

Compositions and properties of prepared PVC compounds.

| Example | PVC1 | PVC2 |
|---|---|---|
| Titanium dioxide (Kronos 2220) | 3.5 (phr) | 3.5 (phr) |
| $CaCO_3$ [a] | 16 (phr) | 0 |
| $CaCO_3$ according to Example D | 0 | 16 (phr) |
| Charpy impact resistance [kJ/m²] ISO 179/1fC | 55.2 | 57.3 |
| Gloss 60°[—] | 33.7 | 43.1 |
| L*-value | 95.5 | 95.4 |
| a*/b* -value | −0.22/4.18 | −0.51/4.23 |

[a] Ground calcium carbonate, commercially available from Omya AG, Switzerland, particle size $d_{50}$: 0.8 μm; top cut $d_{98}$: 5.0 μm.

As can be gathered from the results given in Tables 7 and 8 mechanical and optical properties improve when the inventive products are applied. Particularly noteworthy is the significant improvement of the gloss at higher filler contents (see Table 8).

The invention claimed is:

1. A process for preparing an aqueous suspension comprising at least one calcium carbonate-containing material, the process comprising:
   a) providing an aqueous suspension of at least one calcium carbonate-containing material, wherein the aqueous suspension of at least one calcium carbonate-containing material is free of dispersants or contains less than 0.05 wt. % of dispersants, based on the total dry weight of the least one calcium carbonate-containing material,
   b) pre-heating the suspension of step a) to a temperature of from 60 to 95° C. at ambient pressure and contacting the suspension of step a) with NaOH to obtain an aqueous suspension having a pH measured at 25° C. of 10.0 to 13.0, and
   c) wet-grinding the pre-heated and NaOH treated suspension of step b) in at least one grinding step to obtain an aqueous suspension of at least one calcium carbonate-containing material having a ratio of particles having an average particle size $d_{80}$ value to particles having an average particle size $d_{20}$ value $[d_{80}/d_{20}]$ of ≤2.50.

2. The process according to claim 1, wherein the at least one calcium carbonate-containing material provided in the aqueous suspension of step a) is dolomite and/or a natural ground calcium carbonate (NGCC).

3. The process according to claim 1, wherein the at least one calcium carbonate-containing material provided in the aqueous suspension of step a) is natural ground calcium carbonate (NGCC) selected from one or more of marble, limestone and chalk.

4. The process according to claim 1, wherein the aqueous suspension provided in step a) has solids content of from 5.0 wt.-% to 60.0 wt.-%, based on the total weight of the aqueous suspension.

5. The process according to claim 1, wherein the aqueous suspension provided in step a) has solids content of from 10.0 wt.-% to 50.0 wt.-%, based on the total weight of the aqueous suspension.

6. The process according to claim 1, wherein the aqueous suspension of step a) is adjusted in step b) to a temperature of from 60 to 90° C., at ambient pressure.

7. The process according to claim 1, wherein NaOH is added in step b) to obtain an aqueous suspension having a pH measured at 25° C. of from 11.0 to 12.5.

8. The process according to claim 1, wherein the NaOH in step b) is added in an amount of ≥0.05 wt.-%, based on the total dry weight of the calcium carbonate-containing material.

9. The process according to claim 1, wherein the NaOH in step b) is added in an amount of ≥0.1 wt.-%, based on the total dry weight of the calcium carbonate-containing material.

10. The process according to claim 1, wherein the NaOH in step b) is added in an amount from 0.2 to 1.0 wt.-%, based on the total dry weight of the calcium carbonate-containing material.

11. The process according to claim 1, wherein step c) is carried out at a starting temperature of from 60 to 95° C.

12. The process according to claim 1, wherein step c) is carried out at a starting temperature of from 60 to 80° C.

13. The process according to claim 1, wherein step c) is carried out at a starting temperature of from 65 to 75° C.

14. The process according to claim 1, wherein the aqueous suspension obtained in step c) is stored at a temperature of from 70 to 140° C. for a period of time of <5 hours.

15. The process according to claim 1, wherein the aqueous suspension obtained in step c) is stored at a temperature of from 80 to 95° C. for a period of time from 5 minutes to 2 hours.

16. The process according to claim 1, wherein the aqueous suspension obtained in step c) is stored at a solids content of from 5.0 wt.-% to 60.0 wt.-%, based on the total weight of the aqueous suspension.

17. The process according to claim 1, wherein the aqueous suspension obtained in step c) is stored at a solids content of from 15.0 wt.-% to 50.0 wt.-%, based on the total weight of the aqueous suspension.

18. The process according to claim 1, wherein the aqueous suspension obtained in step c) is subjected to drying or dewatering to remove at least a portion of water to obtain a partially dewatered calcium carbonate-containing material or to obtain an essentially completely dried calcium carbonate-containing material, or is first stored at temperature of from 70 to 140° C. for a period of 5 minutes to <5 hours, and then subjected to drying or dewatering to obtain a partially dewatered calcium carbonate-containing material or to obtain an essentially completely dried calcium carbonate-containing material.

19. The process according to claim 18, wherein
   a) the partially dewatered calcium carbonate-containing material is treated after dewatering with at least one dispersing agent and rediluted to obtain an aqueous suspension comprising a dispersed calcium carbonate-containing material, and/or
   b) the partially dewatered calcium carbonate-containing material and/or the essentially completely dried calcium carbonate-containing material is treated before or after dewatering or drying with at least one saturated aliphatic linear or branched carboxylic acid to obtain a hydrophobized calcium carbonate-containing material.

20. The process according to claim 1, wherein the at least one calcium carbonate-containing material obtained in step c) that is optionally subjected to storage and/or drying or dewatering, has a ratio of particles having an average particle size $d_{90}$ value to particles having an average particle size $d_{10}$ value $[d_{90}/d_{10}]$ of ≤4.50.

21. The process according to claim 1, wherein the at least one calcium carbonate-containing material obtained in step c), that is optionally subjected to storage and/or drying or dewatering, has a BET specific surface area of ≤15.0 m²/g.

22. The process according to claim 1, wherein the at least one calcium carbonate-containing material obtained in step c), that is optionally subjected to storage and/or drying or dewatering, has a BET specific surface area of from 1.0 to 15.0 m$^2$/g.

23. The process according to claim 1, wherein the at least one calcium carbonate-containing material obtained in step c), that is optionally subjected to storage and/or drying or dewatering, has a BET specific surface area of from 3.0 to 13.0 m$^2$/g.

24. The process according to claim 1, wherein the at least one calcium carbonate-containing material obtained in step c), that is optionally subjected to storage and/or drying or dewatering, has a lower ratio of particles having an average particle size $d_{80}$ value to particles having an average particle size $d_{20}$ value [$d_{80}/d_{20}$] than a calcium carbonate-containing material that is obtained by wet-grinding the same suspension of step a) to similar particle size but without performing step b).

25. A calcium carbonate-containing material obtained by the process of claim 1.

26. The calcium carbonate-containing material of claim 25, having a ratio of particles having an average particle size $d_{90}$ value to particles having an average particle size $d_{10}$ value [$d_{90}/d_{10}$] of ≤4.50.

27. The calcium carbonate-containing material of claim 25, having a BET specific surface area of ≤15.0 m$^2$/g.

28. The calcium carbonate-containing material of claim 25, having a BET specific surface area of from 3.0 to 13.0 m$^2$/g.

29. The calcium carbonate-containing material of claim 25, having a lower ratio of particles having an average particle size $d_{80}$ value to particles having an average particle size $d_{20}$ value [$d_{80}/d_{20}$] than a calcium carbonate-containing material that is obtained by wet-grinding the same suspension of step a) to similar particle size but without performing step b).

30. An adhesive, cosmetic, sealant, caulk, paint, coating or plastic comprising the calcium carbonate-containing material according to claim 25.

* * * * *